United States Patent
Ebuchi et al.

(10) Patent No.: US 9,816,570 B2
(45) Date of Patent: Nov. 14, 2017

(54) ELECTROMAGNETIC ACTUATOR

(71) Applicant: TOYOTA JIDOSHA KABUSHIKI KAISHA, Toyota-shi (JP)

(72) Inventors: Hiroaki Ebuchi, Hadano (JP); Yuji Iwase, Mishima (JP); Shotaro Kato, Susono (JP); Hidekazu Nagai, Susono (JP); Hiroto Hashimoto, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 201 days.

(21) Appl. No.: 14/895,791

(22) PCT Filed: May 27, 2014

(86) PCT No.: PCT/JP2014/064033
§ 371 (c)(1),
(2) Date: Dec. 3, 2015

(87) PCT Pub. No.: WO2014/196420
PCT Pub. Date: Dec. 11, 2014

(65) Prior Publication Data
US 2016/0131203 A1 May 12, 2016

(30) Foreign Application Priority Data

Jun. 3, 2013 (JP) .................................. 2013-117296
Aug. 6, 2013 (JP) .................................. 2013-163173

(51) Int. Cl.
*F16D 11/14* (2006.01)
*F16D 27/118* (2006.01)
(Continued)

(52) U.S. Cl.
CPC ............ *F16D 27/118* (2013.01); *F16D 11/14* (2013.01); *H01F 7/08* (2013.01); *F16D 2011/002* (2013.01)

(58) Field of Classification Search
CPC ... F16D 11/14; F16D 27/118; F16D 2011/002
See application file for complete search history.

(56) References Cited

U.S. PATENT DOCUMENTS

2010/0276245 A1* 11/2010 Umeno .................... F16D 11/10
192/69.81
2011/0063058 A1 3/2011 Ideshio et al.
(Continued)

FOREIGN PATENT DOCUMENTS

JP 2004-104974 A 4/2004
JP 2004-183874 A 7/2004
(Continued)

OTHER PUBLICATIONS

International Search Report dated Aug. 12, 2014 in PCT/JP14/064033 Filed May 27, 2014.

*Primary Examiner* — Justin Holmes
*Assistant Examiner* — Lillian Nguyen
(74) *Attorney, Agent, or Firm* — Oblon, McClelland, Maier & Neustadt, L.L.P.

(57) ABSTRACT

An electromagnetic actuator includes an electromagnetic coil, fixed portions placed around the electromagnetic coil, and a movable portion including a magnetic circuit of the electromagnetic coil together with the fixed portions. The movable portion is configured to operate an operated member by moving in a predetermined direction due to an electromagnetic force generated in the magnetic circuit. The movable portion includes a first member and a second member. The first member and the second member are supported respectively by the fixed portions. The first member and the second member are incorporated to each other by sandwiching the operated member from both sides in the predetermined direction.

5 Claims, 3 Drawing Sheets

(51) Int. Cl.
*H01F 7/08* (2006.01)
*F16D 11/00* (2006.01)

(56) References Cited

U.S. PATENT DOCUMENTS

| 2015/0184699 | A1* | 7/2015 | Kato | F16D 27/118 |
| | | | | 192/69 |
| 2016/0131203 | A1* | 5/2016 | Ebuchi | F16D 11/14 |
| | | | | 192/84.92 |

FOREIGN PATENT DOCUMENTS

| JP | 2009-58107 A | 3/2009 |
| JP | 2010-25279 A | 2/2010 |

* cited by examiner

FIG. 3

ELECTROMAGNETIC ACTUATOR

TECHNICAL FIELD

The present invention relates to an electromagnetic actuator.

BACKGROUND ART

There has been known such a configuration of a gear shifter for a vehicle that a meshing-type dog clutch driven by an electromagnetic actuator is included, and a rotation of a rotating element in the gear shifter is regulated by driving of the dog clutch (see Patent Document 1, for example).

CITATION LIST

Patent Documents

Patent Document 1: Japanese Patent Application Publication No. 2009-058107 (JP 2009-058107 A)

SUMMARY OF THE INVENTION

Problem to be Solved by the Invention

For example, as described in Patent Document 1, a conventional electromagnetic actuator includes a movable portion that moves in an axis direction relative to a sleeve (an operated member) supported in a cantilever manner, and a fixed portion. In the electromagnetic actuator, the movable portion and the fixed portion are placed around a coil so as to form a magnetic circuit, and the movable portion is magnetically attracted in the axis direction by an electromagnetic force toward the fixed part, thereby moving the sleeve to a meshing portion of the dog clutch. In such a conventional electromagnetic actuator, the movable portion is supported to the fixed portion at only one point, and further, the movable portion and the sleeve are supported in a cantilever manner, so the sleeve may be inclined relative to the movable portion and a thrust cannot be transmitted to the sleeve sufficiently.

The present invention is accomplished in view of the above problem, and an object of the present invention is to provide an electromagnetic actuator that can transmit a thrust to an operated member appropriately.

Means for Solving the Problem

In order to achieve the above object, an electromagnetic actuator according to the present invention is characterized by comprising: an electromagnetic coil; fixed portions placed around the electromagnetic coil; and a movable portion that forms a magnetic circuit of the electromagnetic coil together with the fixed portions and operates an operated member by moving in a predetermined direction due to an electromagnetic force generated in the magnetic circuit, wherein: the movable portion is constituted by two members; and the two members of the movable portion are supported individually by the fixed portions, and are incorporated to each other by sandwiching the operated member from both sides in the predetermined direction.

Further, in the above electromagnetic actuator, it is preferable that the operated member and the movable portion be provided around a rotating element; a position of the movable portion in a radial direction of the rotating element be maintained constant such that the movable portion is placed on an outer side relative to the operated member in the radial direction of the rotating element and is movable in an axial direction of the rotating element; the operated member be splined to a support member which is maintained at a constant position in the radial direction and which is placed on an inner side relative to the operated member in the radial direction, so that the operated member is placed in a movable manner in the axis direction; the operated member be placed in a perturbed manner in the radial direction between the movable portion and the support member; and a maximum value of that radial distance between the movable portion and the operated member which changes due to the perturbation of the operated member be set to be larger than a maximum value of that radial distance of a spline portion between the operated member and the support member which changes due to the perturbation of the operated member.

Further, in the above electromagnetic actuator, it is preferable that one of the two members of the movable portion be made of a magnetic material, and the other one of the two members be made of a non-magnetic material.

Further, in the above electromagnetic actuator, it is preferable that the electromagnetic actuator be provided around the rotating element; the predetermined direction in which the movable portion moves be an axial direction of the axis; and respective support portions for the two members of the movable portion with respect to the fixed portions be placed so that their positions in the radial direction of the rotating element are the same.

Further, it is preferable that the above electromagnetic actuator include a waiting mechanism configured to suspend a movement of the operated member in the predetermined direction, the waiting mechanism being provided between the movable portion and the operated member.

Advantageous Effects of Invention

Since the electromagnetic actuator of the present invention is configured such that the movable portion is supported at both sides by the fixed portions, it is possible to improve stability of a movement of the movable portion and to efficiently transmit a thrust to the operated member. As a result, the electromagnetic actuator according to the present invention yields such an effect that a thrust can be transmitted to the operated member appropriately.

MODES FOR CARRYING OUT THE INVENTION

The following describes embodiments of an electromagnetic actuator of the present invention with reference to the drawings. Note that the same or equivalent portions in the drawings have the same reference numeral and descriptions thereof are not repeated.

First Embodiment

Figure 1:
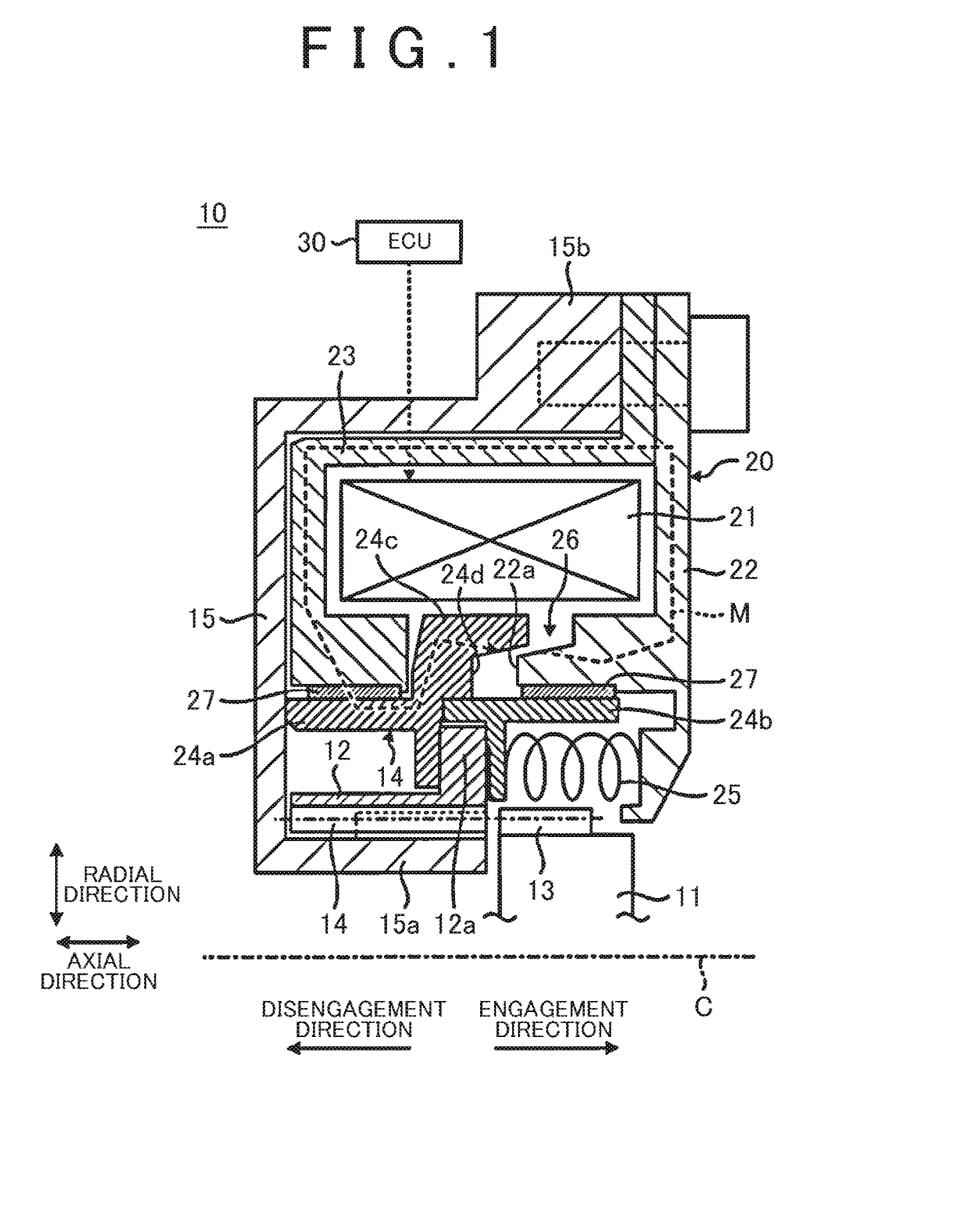
FIG. 1 is a sectional schematic view illustrating a schematic configuration of an engaging device to which an electromagnetic actuator according to a first embodiment of the present invention is applied.
Figure 2:
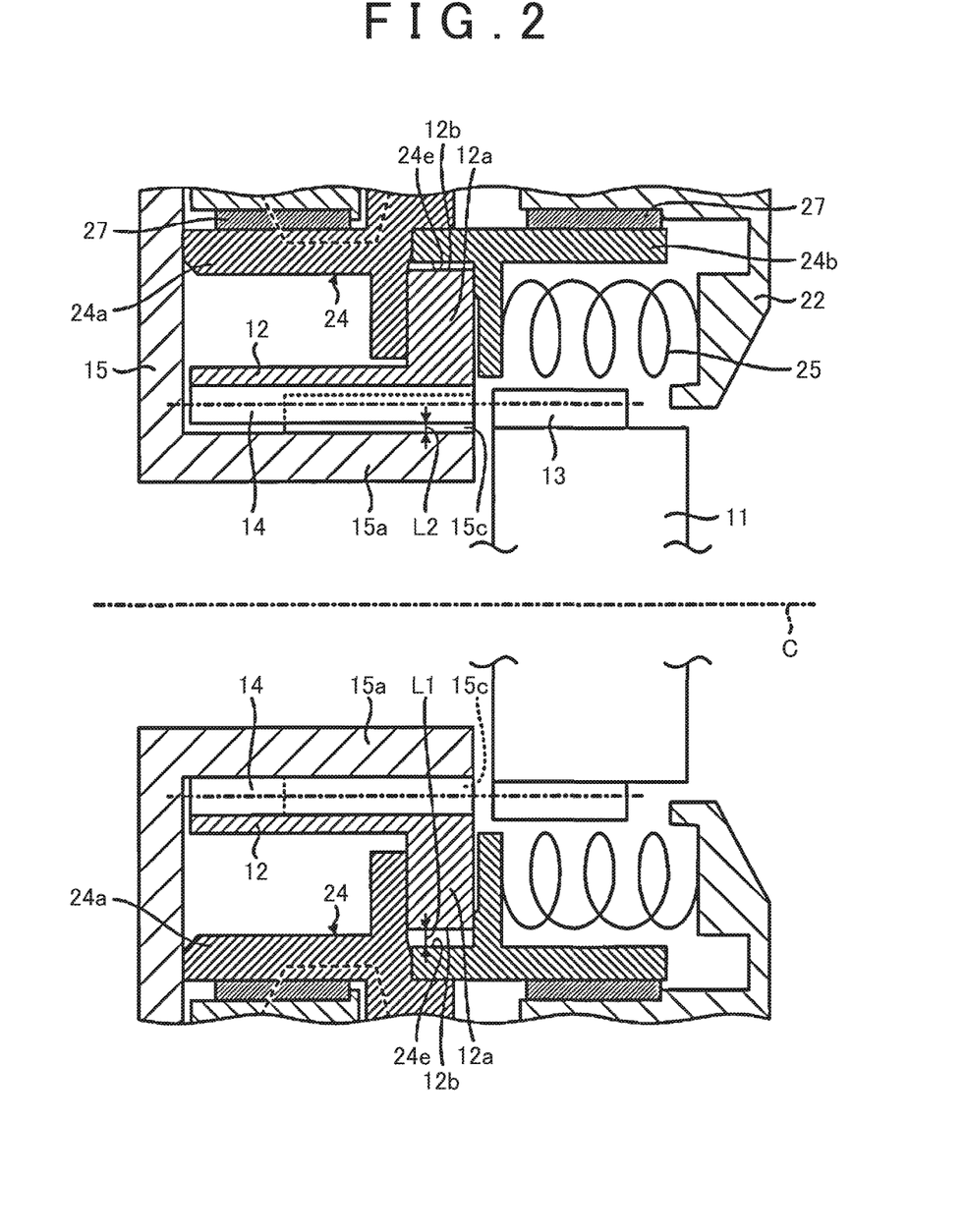
FIG. 2 is a schematic view illustrating a vicinity of a sleeve in FIG. 1 in an enlarged manner and also illustrating its opposite side in a radial direction.

With reference to FIGS. 1, 2, the following describes a first embodiment of the present invention. FIG. 1 is a sectional schematic view illustrating a schematic configuration of an engaging device to which an electromagnetic actuator according to the first embodiment of the present invention is applied, and FIG. 2 is a schematic view illustrating a vicinity of a sleeve in FIG. 1 in an enlarged manner and also illustrating its opposite side in a radial direction.

First described is a configuration of an engaging device 10 to which an electromagnetic actuator 20 according to the first embodiment is applied. The engaging device 10 illustrated in FIG. 1 is incorporated, for example, into a power transmission device that transmits power from a drive source such as engine or a motor to an output shaft in a hybrid vehicle. For example, in order to control the power to be transmitted to the output shaft from the power transmission device, the engaging device 10 is used as a braking device for partially regulating a rotation of a rotating element of the power transmission device. Note that a detailed structure such as an overall configuration of the power transmission device is not directly related to the gist of the present invention, so that a description thereof is omitted.

As illustrated in FIG. 1, the engaging device 10 includes a piece 11, a sleeve 12 (an operated member), a hub bracket 15 (a support member), an electromagnetic actuator 20, and an ECU 30 (Electronic Control Unit).

The piece 11 and the sleeve 12 are placed around the rotating element. The rotating element is assumed to rotate around an axis C drawn by an alternate long and short dash line along a right-left direction in a lower part of FIG. 1, and in the following description, the right-left direction in the figure is referred to as an "axial direction" of the rotating element, and an up-down direction is referred to as a "radial direction" of the rotating element, unless otherwise specified. Further, a direction around the axis C is referred to as a "circumferential direction" of the rotating element.

The piece 11 rotates around the axis C integrally in conjunction with the rotating element. Movements of the piece 11 in the axial direction and in the radial direction are regulated.

The sleeve 12 is placed on a radially outer side relative to the piece 11. The sleeve 12 is splined to the hub bracket 15. The hub bracket 15 is secured to a case (not shown) that contains constituents of the power transmission device therein. That is, the sleeve 12 is splined to the hub bracket 15 so as to be movable in the axial direction, and its movement in the radial direction and its rotation around the axis C are regulated. Further, the sleeve 12 includes a sandwiched portion 12a extending outwardly in the radial direction.

The piece 11 and the sleeve 12 are configured such that an inner peripheral surface of the sleeve 12 can be engaged/disengaged with/from an outer peripheral surface of the piece 11 by an axial movement of the sleeve 12. A plurality of dog teeth 13 is disposed on the outer peripheral surface of the piece 11 along the circumferential direction around the axis C so as to be directed outwardly in the radial direction. A plurality of dog teeth 14 is disposed on the inner peripheral surface of the sleeve 12 along the circumferential direction around the axis C so as to be directed inwardly in the radial direction. These dog teeth 13, 14 serve as a meshing dog clutch, and when they mesh with each other, the piece 11 can be engaged with the sleeve 12. When the sleeve 12 is splined to the piece 11, the rotation of the rotating element in conjunction with the piece 11 can be fixed.

In FIG. 1, the sleeve 12 is placed on a left side relative to the piece 11, and when the sleeve 12 moves in a right direction, the sleeve 12 is engaged with the piece 11, and when the sleeve 12 moves in a left direction, the sleeve 12 is disengaged from the piece 11. In the following description, the right direction in FIG. 1 is also referred to as an "engagement direction," and the left direction is also referred to as a "disengagement direction."

The electromagnetic actuator 20 is a power source for generating a driving force in the axial direction and moving the sleeve 12 in the axial direction. As illustrated in FIG. 1, the electromagnetic actuator 20 of the present embodiment is more specifically an electromagnetic-solenoid type actuator. The electromagnetic actuator 20 is placed around the rotating element that rotates around the axis C and on a radially outer side relative to the piece 11 and the sleeve 12.

The electromagnetic actuator 20 includes an electromagnetic coil 21, an inner yoke 22 (a fixed portion), an outer yoke 23 (a fixed portion), an armature 24 (a movable portion), and a return spring 25.

The inner yoke 22 is placed around the electromagnetic coil 21 from an engagement direction side, and the outer yoke 23 is placed around the electromagnetic coil 21 from a disengagement direction side. The inner yoke 22 and the outer yoke 23 are connected to each other on a radially outer side relative to the electromagnetic coil 21, so as to be secured to the case. That is, the inner yoke 22 and the outer yoke 23 function as fixed portions placed in a fixed manner around the electromagnetic coil 21 so as to sandwich the electromagnetic coil 21 from both sides in the axial direction. Further, the inner yoke 22 and the outer yoke 23 are not connected to each other on a radially inner side relative to the electromagnetic coil 21, so as to form an opening 26 in part of the radially inner side relative to the electromagnetic coil 21. The inner yoke 22 and the outer yoke 23 are both made of a magnetic material.

The armature 24 is placed on a radially inner side relative to the inner yoke 22 and the outer yoke 23 and on a radially outer side relative to the sleeve 12. The armature 24 is placed in an axially movable manner, and can give a thrust to the sleeve 12 by its axial movement.

The armature 24 is constituted by two members, i.e., a first member 24a and a second member 24b. The first member 24a of the armature 24 is placed so that the first member 24a can abut with the sandwiched portion 12a of the sleeve 12 from the disengagement direction side along the axial direction, and the second member 24b is placed so that the second member 24b can abut with the sandwiched portion 12a of the sleeve 12 from the engagement direction side. That is, the armature 24 is placed in a state where the sandwiched portion 12a of the sleeve 12 is sandwiched from both sides in the axial direction, and is configured to improve a relation between the armature 24 and the sleeve 12. Further, with this configuration, an assembling characteristic of the sleeve 12 to be placed between the first member 24a and the second member 24b can be secured.

The first member 24a of the armature 24 is supported on a radially inner side of the outer yoke 23 via a supporting member 27 such as a plating or a bush, and the second member 24b is supported on a radially inner side of the inner yoke 22 via a supporting member 27. That is, the first member 24a and the second member 24b are supported individually by the fixed portions (the inner yoke 22, the outer yoke 23). That is, the armature 24 has two supporting points by the fixed portions along the axial direction so as to be supported at both sides (supported at two points), and is configured to improve stability of an axial movement and to efficiently transmit a thrust to the sleeve 12.

Further, the armature 24 is formed as an integrated member by press-fitting and fixing the second member 24b to the first member 24a. Hereby, even if the armature 24 is constituted by a plurality of members, it is possible to perform an integrated operation while achieving downsizing of a dimension in the radial direction and the axial dimension, improvement in the assembling characteristic, and improvement in performance by inertial reduction. Note that the first member 24a and the second member 24b of the armature 24 may be fastened by fastening means such as bolts.

Further, the first member 24a of the armature 24 includes a projecting portion 24c that projects outwardly in the radial direction and toward the engagement direction side along the axial direction. The projecting portion 24c is inserted into the opening 26 between the inner yoke 22 and the outer yoke 23. An end surface of the projecting portion 24c on the engagement direction side is provided with a stopper surface 24d perpendicular to an operation direction of the armature 24. Meanwhile, an end surface of the inner yoke 22 on the disengagement direction side is also provided with a stopper surface 22a at a position opposed to the stopper surface 24d of the armature 24. When the armature 24 moves in the engagement direction, the stopper surface 24d of the armature 24 abuts with the stopper surface 22a of the inner yoke 22, thereby making it possible to stop the movement of the armature 24 in the engagement direction.

The first member 24a of the armature 24 is made of a magnetic material, and the second member 24b is made of a non-magnetic material. Hereby, it is possible to block unnecessary magnetic paths without providing an air gap or the like in support portions (the supporting members 27) for the first member 24a and the second member 24b with respect to the fixed portions (the inner yoke 22, the outer yoke 23).

Further, the support portions in two-point support for the armature 24 with respect to the fixed portions are set to have the same radial dimension. That is, the support portion between the first member 4a of the armature 24 and the outer yoke 23 and the support portion between the second member 24b and the inner yoke 22 are placed on the same radial position. Here, "the radial positions of both support portions are the same" indicates that a deviation between the radial dimensions of respective support portions is within a predetermined range (for example, ±0.2 mm or less). This accordingly makes it possible to improve machining accuracy and support accuracy.

The return spring 25 is placed between the second member 24b of the armature 24 and the inner yoke 22. The return spring 25 is a compression spring, for example, and is held in a state where the return spring 25 is compressed moderately, so as to bias the armature 24 in the disengagement direction. As the armature 24 moves in the engagement direction, that is, as a meshing degree between the sleeve 12 and the piece 11 is deepened, the return spring 25 generates a larger biasing force in the disengagement direction.

The hub bracket 15 includes an inner cylindrical portion 15a which is provided around the axis C so as to extend adjacently to the piece 11 and which is splined to the sleeve 12. The hub bracket 15 has a shape extending outwardly in the radial direction and covering the sleeve 12 and the electromagnetic actuator 20, along a shape of the electromagnetic actuator 20 from the inner cylindrical portion 15a, and is fixed to the case (not shown) with bolts at its outer edge portion 15b. The inner cylindrical portion 15a of the hub bracket 15 is placed on a radially inner side relative to the sleeve 12, and a plurality of spline teeth 15c is disposed on an outer peripheral surface of the inner cylindrical portion 15a so as to be directed outwardly in the radial direction along its circumferential direction (see FIG. 2). When the dog teeth 14 are inserted between the spline teeth 15c, the sleeve 12 is splined to the hub bracket 15, so as to be supported in an axially movable manner.

Here, with reference to FIG. 2, the following describes setting of radial positions of the armature 24 of the electromagnetic actuator 20 and the inner cylindrical portion 15a of the hub bracket 15. As illustrated in FIG. 2, constituents of the engaging device 10 are placed concentrically around the axis C. Since the armature 24 is supported at two points by the fixed portions (the inner yoke 22, the outer yoke 23) via the supporting members 27 as described above, its radial position is maintained constant. Further, since the hub bracket 15 is secured to the case (not shown) as described above, its radial position is maintained constant. The sleeve 12 is placed, in the radial direction, between the armature 24 and the inner cylindrical portion 15a of the hub bracket 15 each of which is placed at a fixed position as such. Respective radial positions of the armature 24 and the hub bracket 15 are set so that the sleeve 12 can be perturbed in the radial direction therebetween.

In a spline portion between the sleeve 12 and the hub bracket 15, radial rattling is caused due to a radial gap between tips of the dog teeth 14 and roots of the spline teeth 15c, a radial gap between tips of the spline teeth 15c and roots of the dog teeth 14, or a radial gap between tooth flanks of the dog teeth 14 and tooth flanks of the spline teeth 15c. It can be said that the radial rattling is such a phenomenon that a shaft center of the sleeve 12 deviates from a shaft center (the axis C) of the hub bracket 15, so that a relative position, in the radial direction, of the sleeve 12 relative to the hub bracket 15 fluctuates within a predetermined range. A width of the radial rattling can be expressed as a distance, for example, from a radial position at which one dog tooth 14 in the sleeve 12 abuts with a root of a spline tooth 15c of the hub bracket 15 (i.e., a position of a dog tooth 14 illustrated on a lower side relative to the axis C in FIG. 2), to a position at which a dog tooth 14 (a dog tooth 14 illustrated on an upper side relative to the axis C in FIG. 2) placed on a radially opposite side to the one dog tooth 14 (placed at a position opposite to the one dog tooth 14 by 180 degrees) abuts with a root of a spline tooth 15c. In FIG. 2, the width of the radial rattling is indicated by a reference numeral L2. Note that the radial rattling can be expressed as "a change of that radial distance of the spline portion between the sleeve 12 and the hub bracket 15 which changes due to perturbation of the sleeve 12." The width L2 of the radial rattling can be expressed as "a maximum value of that radial distance of the spline portion between the sleeve 12 and the hub bracket 15 which changes due to perturbation of the sleeve 12."

Due to the occurrence of such radial rattling, a relative position, in the radial direction, of the sleeve 12 relative to the armature 24 also fluctuates. More specifically, a radial distance between an outer peripheral surface 12b of the sandwiched portion 12a of the sleeve 12 and that radially inside facing surface 24e of the armature 24 which is opposed to the outer peripheral surface 12b fluctuates. The radial distance becomes largest in a state where the dog teeth 14 come closest to the hub bracket 15 as illustrated on the lower side relative to the axis C in FIG. 2. In FIG. 2, a maximum value of the radial distance between the outer peripheral surface 12b of the sleeve 12 and the facing surface 24e of the armature 24 at this time is indicated by a reference numeral L1.

In the present embodiment, the maximum value L1 of the radial distance between the outer peripheral surface 12b of the sleeve 12 and the facing surface 24e of the armature 24 is set to be larger than the width L2 of the radial rattling of the spline portion between the sleeve 12 and the hub bracket 15. That is, a relationship of L1>L2 is satisfied. Hereby, even if the sleeve 12 is perturbed in the axial direction due to the radial rattling of the spline portion between the sleeve 12 and the hub bracket 15, it is possible to regularly form a gap between the outer peripheral surface 12b of the sleeve 12 and the facing surface 24e of the armature 24.

The ECU 30 is a control device for controlling each part of a vehicle based on information of various sensors in the vehicle. In the present embodiment, the ECU 30 is connected to the electromagnetic actuator 20 of the engaging device 10, and by controlling an operation of the electromagnetic actuator 20, the ECU 30 controls an axial movement of the sleeve 12, thereby making it possible to control engagement/disengagement of the engaging device 10.

The ECU 30 is physically an electronic circuit mainly constituted by a well-known microcomputer including a CPU (Central Processing Unit), a RAM (Random Access Memory), a ROM (Read Only Memory), an input-output interface, and so on. Each function of the ECU 30 is implemented such that an application program stored in the ROM is loaded into the RAM and then executed by the CPU so as to operate various devices in the vehicle under the control of the CPU, and reading and writing of data in the RAM and the ROM are performed.

Next will be described an operation of the engaging device 10 to which the electromagnetic actuator 20 according to the first embodiment is applied.

When the electromagnetic coil 21 of the electromagnetic actuator 20 is in a non-exciting state, the electromagnetic actuator 20 stops, and the sandwiched portion 12a of the sleeve 12 receives a biasing force of the return spring 25 in the disengagement direction via the second member 24b of the armature 24. Due to the biasing force, the sleeve 12 is held at that position, on the inner cylindrical portion 15a of the hub bracket 15, which is distanced from the piece 11, so that the sleeve 12 is in a state where the sleeve 12 does not mesh with the piece 11, as illustrated in FIG. 1. That is, when the electromagnetic actuator 20 is in a non-exciting state, the engaging device 10 enters a disengaged state, so that the piece 11 can rotate around the axis C in conjunction with the rotating element.

When the electromagnetic coil 21 is magnetically excited in response to a control command from the ECU 30, a magnetic circuit M going around the inner yoke 22, the outer yoke 23, and the first member 24a of the armature 24, which are magnetic materials placed around the electromagnetic coil 21 is formed. As illustrated by a dotted arrow in FIG. 1, the magnetic circuit M is formed so as to cross a gap between the stopper surface 24d of the projecting portion 24c of the armature 24 and the stopper surface 22a of the inner yoke 22. Accordingly, the armature 24 is guided by the inner peripheral surfaces of the inner yoke 22 and the outer yoke 23, and magnetically attracted toward the inner yoke 22. The armature 24 moves in the engagement direction against the return spring 25 by this magnetic attraction force (an electromagnetic force). Along with this action of the armature 24, the sandwiched portion 12a of the sleeve 12 receives a thrust, so that the sleeve 12 moves in the engagement direction, and hereby, the dog teeth 14 of the sleeve 12 are in a meshing state where the dog teeth 14 mesh with the dog teeth 13 of the piece 11. That is, when the electromagnetic actuator 20 is in an excited state, the engaging device 10 enters an engaged state, so that the rotation of the rotating element connected to the piece 11 can be stopped.

Next will be described an effect of the electromagnetic actuator 20 according to the first embodiment.

The electromagnetic actuator 20 of the first embodiment includes: the electromagnetic coil 21; the fixed portions (the inner yoke 22 and the outer yoke 23) placed around the electromagnetic coil 21; and the armature 24 that forms a magnetic circuit M of the electromagnetic coil 21 together with the fixed portions and operates the sleeve 12 by moving in a predetermined direction (the axial direction of the axis C) due to an electromagnetic force generated in the magnetic circuit M. The armature 24 is constituted by two members, i.e., the first member 24a and the second member 24b. The first member 24a and the second member 24b of the armature 24 are individually supported by the fixed portions, and incorporated to each other by sandwiching the sleeve 12 from both sides in a moving direction (the axial direction).

With this configuration, since the armature 24 has a plurality of supporting points so as to be supported at both sides by the fixed portions (the inner yoke 22 and the outer yoke 23), it is possible to restrain the armature 24 from being inclined relative to the moving direction, to improve stability of the movement of the armature 24, and to efficiently transmit a thrust to the sleeve 12. Further, since the first member 24a and the second member 24b of the armature 24 are placed so as to sandwich the sleeve 12 therebetween, it is possible to surely connect the armature 24 to the sleeve 12, and to improve the relation between the armature 24 and the sleeve 12. Accordingly, the electromagnetic actuator 20 of the first embodiment can transmit a thrust to the sleeve 12, which is an operated member, appropriately.

Further, in the electromagnetic actuator 20 according to the first embodiment, the sleeve 12 and the armature 24 are provided around the rotating element that rotates around a predetermined axis C. The armature 24 is configured such that: its position in the radial direction of the rotating element is maintained constant; the armature 24 is placed on an outer side relative to the sleeve 12 in the radial direction of the rotating element; and the armature 24 is movable in the axial direction of the rotating element. The sleeve 12 is splined to the spline teeth 15c of the hub bracket 15 whose radial position is maintained constant and which is placed on a radially inner side relative to the sleeve 12, so that the sleeve 12 is placed in an axially movable manner. The sleeve 12 is placed so as to be perturbed in the radial direction between the armature 24 and the inner cylindrical portion 15a of the hub bracket 15. A maximum value L1 of that radial distance between the armature 24 and the sleeve 12 which changes due to perturbation of the sleeve 12 is set to be larger than a maximum value L2 (that is, a width of radial rattling) of that radial distance of the spline portion between the sleeve 12 and the hub bracket 15 which changes due to perturbation of the sleeve 12 (L1>L2).

With this configuration, even if the sleeve 12 is perturbed in the axial direction due to the radial rattling of the spline portion between the sleeve 12 and the hub bracket 15, it is possible to regularly form a gap between the outer peripheral surface 12b of the sleeve 12 and the facing surface 24e of the armature 24, thereby making it possible to prevent the sleeve 12 from making contact with the armature 24. On this account, since a radial load at the time of a movement of the sleeve 12 can be received not by the armature 24 but by the spline portion of the hub bracket 15, it is possible to reduce a radial load to the supporting member 27 that supports the armature 24.

Further, in the electromagnetic actuator 20 according to the first embodiment, the first member 24a out of the two members of the armature 24 is made of a magnetic material, and the second member 24b out of the two members is made of a non-magnetic material.

With this configuration, it is possible to block unnecessary magnetic paths without providing an air gap or the like in the support portions for the first member 24a and the second member 24b with respect to the fixed portions (the inner yoke 22, the outer yoke 23).

Further, the electromagnetic actuator 20 according to the first embodiment is provided around the rotating element that rotates around the predetermined axis C. A predetermined direction in which the armature 24 moves is the axial direction (the axis C) of the rotating element. Respective support portions for the first member 24a and the second member 24b of the armature 24 with respect to the fixed portions (the inner yoke 22, the outer yoke 23) are placed so that their positions in the radial direction of the rotating element are the same.

With this configuration, the support portions between the armature 24 and the fixed portions (the inner yoke 22 and the outer yoke 23) can be configured simply, and machining accuracy can be improved, thereby making it possible to improve support accuracy.

Second Embodiment

Figure 3:
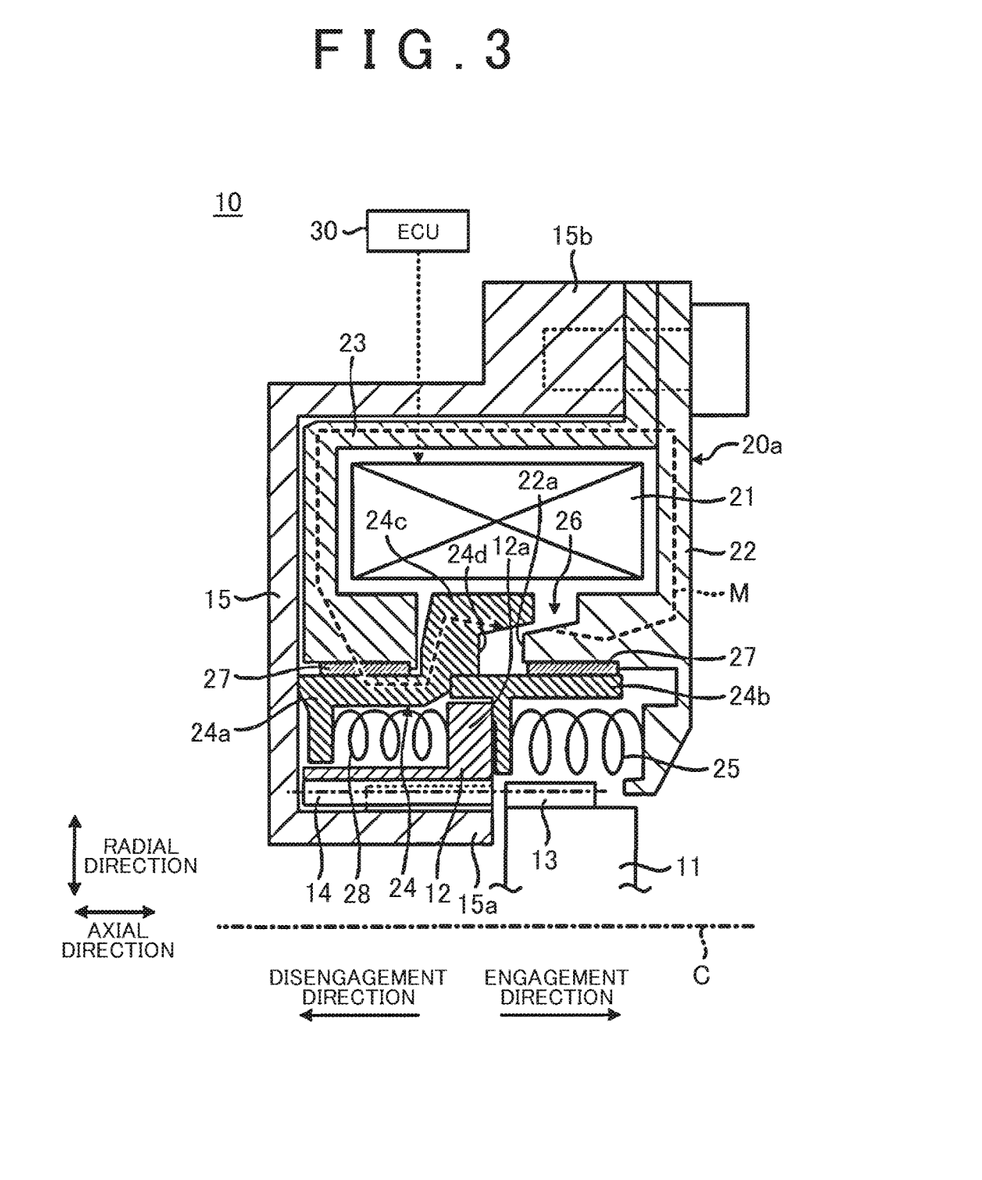
FIG. 3 is a sectional schematic view illustrating a schematic configuration of an engaging device to which an electromagnetic actuator according to a second embodiment of the present invention is applied.

Next will be described a second embodiment of the present invention with reference to FIG. 3. FIG. 3 is a sectional schematic view illustrating a schematic configuration of an engaging device to which an electromagnetic actuator according to a second embodiment of the present invention is applied.

As illustrated in FIG. 3, an electromagnetic actuator 20a of the second embodiment is different from the electromagnetic actuator 20 of the first embodiment in that a waiting mechanism spring 28 is provided between a first member 24a of an armature 24 and a sandwiched portion 12a of a sleeve 12.

The waiting mechanism spring 28 is placed in a stretching manner in the axial direction according to a relative positional relationship, in the axial direction, between the armature 24 and the sandwiched portion 12a of the sleeve 12.

In the electromagnetic actuator 20a according to the second embodiment, when the armature 24 moves in the engagement direction due to a magnetic attraction force generated in a magnetic circuit M of an electromagnetic coil 21, a pressing force received by the waiting mechanism spring 28 from the armature 24 can be transmitted to the sandwiched portion 12a of the sleeve 12, so that the sleeve 12 also can move in the same direction in conjunction with the armature 24.

Here, although the sleeve 12 starts engaging with the piece 11 due to the movement of the sleeve 12 in the engagement direction, dog teeth 14 of the sleeve 12 may not mesh with dog teeth 13 of the piece 11 well because phases of the piece 11 and the sleeve 12 deviate from each other, for example. In such a situation, a further movement of the sleeve 12 in the engagement direction is obstructed by the piece 11, which results in that engagement between the piece 11 and the sleeve 12 becomes incomplete. In the electromagnetic actuator 20a according to the second embodiment, even in such a situation, the armature 24 pushes and contracts the waiting mechanism spring 28, so that the armature 24 can continue moving in the engagement direction. After the situation is changed to such a situation in which the phases of the piece 11 and the sleeve 12 accord with each other, the sleeve 12 is pushed out in the engagement direction by a biasing force of the waiting mechanism spring 28, so that the sleeve 12 moves to a position at which the dog teeth 14 of the sleeve 12 mesh with the dog teeth 13 of the piece 11 sufficiently.

As such, in the electromagnetic actuator 20a according to the second embodiment, in a case where the phases of the piece 11 and the sleeve 12 deviate from each other and the sleeve 12 receives, from the piece 11, a reaction force of a predetermined level or more in the disengagement direction, the movement of the sleeve 12 in the engagement direction is suspended by an operation of the waiting mechanism. spring 28, so that a thrust transmitted from the armature 24 can be stored. Then, when the phases of the piece 11 and the sleeve 12 accord with each other and the reaction force received by the sleeve 12 is reduced, the sleeve 12 can be moved in the engagement direction immediately by use of the thrust thus stored. As a result, since the electromagnetic actuator 20a according to the second embodiment includes the waiting mechanism spring 28, it is possible to more surely perform an engagement operation between the piece 11 and the sleeve 12, which is an operated member.

Note that the waiting mechanism spring 28 may be configured such that, in a state where a thrust is transmitted to the sleeve 12 from the armature 24, the waiting mechanism spring 28 can store a thrust while suspending the movement of the sleeve 12, and the waiting mechanism spring 28 may be replaced with a waiting mechanism realized by an element except the spring.

The embodiments of the present invention have been described above, but these embodiments are merely described as examples and are not intended to limit the scope of the invention. The above embodiments can be performed with other various configurations, and various omissions, substitutions, modifications can be performed without departing from the gist of the invention. The above embodiments and modifications thereof are included in the scope and gist of the invention, and are included within inventions described in Claims and their equivalent ranges.

The above embodiments exemplify a configuration in which the support portion for the first member 24a of the armature 24 with respect to the outer yoke 23 and the support portion for the second member 24b with respect to the inner yoke 22 are placed on the same position in the radial direction of the axis C, but may be configured such that respective radial positions of the support portions are different from each other.

Further, the above embodiments exemplify a configuration in which the armature 24 is supported at two points by the fixed portions (the inner yoke 22 and the outer yoke 23), but two or more supporting points may be provided.

Further, the above embodiments exemplify, as the engaging device 10, a configuration in which the sleeve 12 is connected to a fixed end (the case) via the hub bracket 15 so as to regulate a rotation of the piece 11 at the time when the piece 11 and the sleeve 12 are engaged with each other, that is, a configuration of a so-called braking device. However, the engaging device 10 may have a configuration in which the sleeve 12 is connected to another rotating element, and a running torque of the piece 11 is transmitted to the another rotating element at the time when the piece 11 and the sleeve 12 are engaged with each other, so that the piece 11 and the sleeve 12 rotate integrally, that is, a configuration of a so-called clutch device.

DESCRIPTION OF THE REFERENCE NUMERALS

12/SLEEVE (OPERATED MEMBER)
15/HUB BRACKET (SUPPORT MEMBER)
20, 20a/ELECTROMAGNETIC ACTUATOR
21/ELECTROMAGNETIC COIL
22/INNER YOKE (FIXED PORTION)
23/OUTER YOKE (FIXED PORTION)
24/ARMATURE (MOVABLE PORTION)
24a/FIRST MEMBER
24b/SECOND MEMBER
28/WAITING MECHANISM SPRING (WAITING MECHANISM)

The invention claimed is:

1. An electromagnetic actuator comprising:
an electromagnetic coil;
fixed portions placed around the electromagnetic coil; and
a movable portion including a magnetic circuit of the electromagnetic coil together with the fixed portions, the movable portion configured to operate an operated member by moving in a predetermined direction due to an electromagnetic force generated in the magnetic circuit, wherein
the movable portion includes a first member and a second member,
the first member and the second member are supported respectively by the fixed portions, and
the first member and the second member are incorporated to each other by sandwiching the operated member from both sides in the predetermined direction.

2. The electromagnetic actuator according to claim 1, wherein
the operated member and the movable portion are provided around a rotating element,
the movable portion is placed on an outer side relative to the operated member in a radial direction of the rotating element such that the movable portion is maintained at a constant position in the radial direction of the rotating element, and the movable portion is configured to move in an axial direction of the rotating element,
the operated member is splined to a support member such that the operated member is placed in a movable manner in the axial direction,
the support member is placed on an inner side relative to the operated member in the radial direction such that the support member is maintained at a constant position in the radial direction,
the operated member is placed in a position in the radial direction between the movable portion and the support member such that the operated member is perturbed, and
a maximum value of that radial distance between the movable portion and the operated member which changes due to the perturbation of the operated member is set to be larger than a maximum value of that radial distance of a spline portion between the operated member and the support member which changes due to the perturbation of the operated member.

3. The electromagnetic actuator according to claim 1, wherein
the first member is made of a magnetic material, and the second member is made of a non-magnetic material.

4. The electromagnetic actuator according to claim 1, wherein
the electromagnetic actuator is provided around a rotating element,
the predetermined direction in which the movable portion moves is an axial direction of the rotating element, and
a first support portion on which the first member is supported on the fixed portions and a second support portion on which the second member is supported on the fixed portions are placed such that a position of the first support portion and a position of the second support portion are the same in a radial direction of the rotating element.

5. The electromagnetic actuator according to claim 1, further comprising:
a waiting mechanism configured to suspend a movement of the operated member in the predetermined direction, the waiting mechanism being provided between the movable portion and the operated member.

* * * * *